United States Patent [19]

Walker

[11] 4,184,858
[45] Jan. 22, 1980

[54] ENGINE EMISSION CONTROL DEVICE

[76] Inventor: Robert A. Walker, 5760 W. Third St., Los Angeles, Calif. 90036

[21] Appl. No.: 750,357

[22] Filed: Dec. 14, 1976

Related U.S. Application Data

[63] Continuation of Ser. No. 553,921, Feb. 28, 1975, abandoned.

[51] Int. Cl.² .......................................... B01D 47/00
[52] U.S. Cl. ....................................... 55/228; 55/233; 55/468; 55/524; 55/DIG. 30; 60/310; 123/119 B
[58] Field of Search .................. 55/233, 260, 90, 228, 55/468, DIG. 19, DIG. 28, DIG. 30; 60/310; 123/119 A, 119 B

[56] References Cited

U.S. PATENT DOCUMENTS

| 1,895,618 | 1/1933 | Fedeler | 55/233 |
| 2,843,216 | 7/1958 | Powell | 55/233 |
| 3,473,299 | 10/1969 | Powers | 55/233 |
| 3,495,385 | 2/1970 | Glass | 55/261 |
| 3,665,906 | 5/1972 | DePalma | 55/DIG. 28 |
| 3,721,069 | 3/1973 | Walker | 55/320 |
| 3,944,402 | 3/1976 | Cheremisinoff | 55/233 |

Primary Examiner—Bernard Nozick
Attorney, Agent, or Firm—Christie, Parker & Hale

[57] ABSTRACT

An air pollution control device for use with automobile engines for filtering crankcase and exhaust emissions. The device comprises a filtering chamber containing fluid coated filtering material having an inlet of a first diameter, an outlet of a second, larger diameter to cause a decrease in internal pressure of the air-pollutant mixture entering through the inlet, a controlled gas flow path through the filtering material in the device, a source of fluid for renewing the fluid coating on the filtering material, a fluid reservoir and means for recirculating the fluid for the filtering material. A pair of such devices, one for use with the crankcase emission blow-by system and one for use with the exhaust system of an internal combustion engine provides significant reduction in all exhaust emissions from the engine. Filtering material fluid for each device is recirculated using an independent recirculating system or utilizing the oil circulation system of the engine.

2 Claims, 3 Drawing Figures

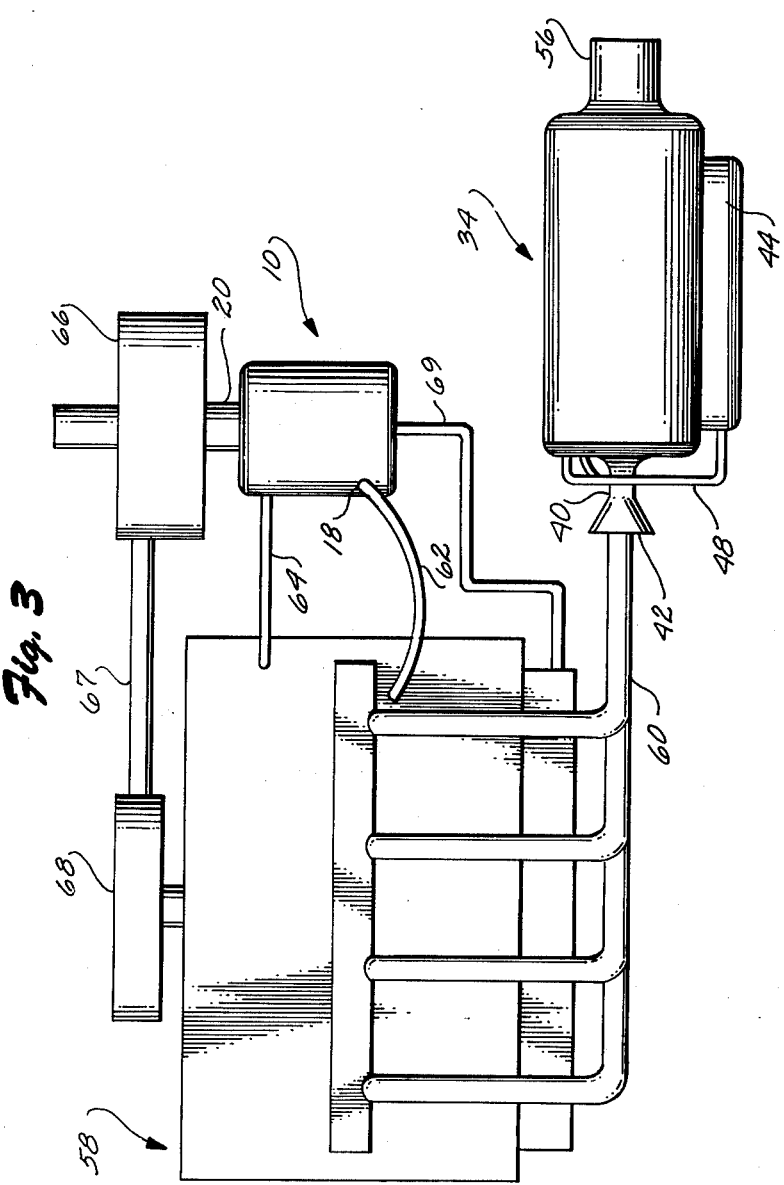

ENGINE EMISSION CONTROL DEVICE

CROSS REFERENCE TO RELATED APPLICATIONS

This is a continuation of application Ser. No. 553,921, filed Feb. 28, 1975 now abandoned.

BACKGROUND OF THE INVENTION

The present invention relates to devices for removing pollutants from internal combustion engine emissions and in particular to an air-pollutant separator for removing pollutants from the exhaust and other engine sources of emission.

The continuing effort to develop ways and means of reducing the pollution from internal combustion engines is well known. This effort continues on at least two broad fronts. On the one hand there is modification of engine operation or replacement with a different type of power source. On the other hand, there are efforts to develop accessories for use with internal combustion engines with and without accompanying engine modifications, both at the intake and exhaust sides of the engine to prevent the engine from creating one or the other of the undesirable types of emissions and to trap and entrain the pollutants emitted by the engine prior to the discharge of the exhaust from the engine to the atmosphere.

Illustrative of such accessories are the catalytic converters which are being utilized in the exhaust system of internal combustion engines. The palladium catalyst used by the converters is a prime factor in requiring engines to be modified so that they can operate on nonleaded fuels. The use of leaded fuels quickly "poison" the palladium catalyst utilized in such converters, thereby quickly rendering them ineffective. The positive crankcase ventilation (PCV) system for reducing pollution due to crankcase emissions including the PCV and valve converter is another example of such engine accessories.

Other examples are filtering devices such as typified by the anti-smog and exhaust device shown in U.S. Pat. No. 3,712,031. In this approach, a rotatable drum containing a filtering material is disposed about a central tube through which the exhaust emissions from an engine are conducted away from the engine. A filtering fluid is mixed with the exhaust emissions prior to entry into the filtering device and upon entry the pollutants are caused to be deposited upon the filtering material contained within the rotating drum and ultimately caused to drain through the filtering material to a reservoir at the bottom of the drum.

Such a system is characterized by a number of disadvantages, including the necessity for an elaborate mechanical drive system in order to rotate the drum and an inability to continually circulate and filter the fluid used to coat the filtering material.

SUMMARY OF THE INVENTION

In contrast, the present invention is an adaptation of a device described in U.S. Pat. No. 3,721,069. The invention provides an apparatus for filtering the emissions from an internal combustion engine without the use of any moving parts. It comprises a housing having a hollow interior, at least one inlet port opening into the housing interior for channeling air-contaminant mixtures into the housing and filtration material located within the interior of the housing. Means are provided defining a flow path through the filtration material for air-contaminant mixtures introduced through the inlet port and an outlet conduit extends from the end of the flow path through a wall of the housing to the exterior thereof, the outlet conduit having a greater cross-sectional area than said inlet port such that a reduction in the pressure of the air-contaminant mixtures in the passage thereof through the housing toward the outlet conduit is produced. Means are also provided for causing a supply of the filtering fluid to be dispersed through the interior of the housing to coat the filtration material.

The present invention also provides an automobile engine air pollution control system comprising a first pollutant filtering apparatus having an inlet port connected to a source of a pollutant mixture from the crankcase of an internal combustion engine, the first apparatus including filtering material contained within the apparatus, first means for directing a filtering fluid through the filtering material to provide a coating thereon, first recirculating means for collecting pollutant-containing filtering fluid from a reservoir of the apparatus, filtering said fluid and conducting the filtered fluid back to the fluid-directing means, first flow path means for directing the pollutant mixture through the fluid-coated filtering material to remove the pollutants, and conduit means for connecting the apparatus at an outlet port to an air intake location for the engine, the outlet port being larger than the intake port to produce a pressure reduction of the pollutant mixture during passage between inlet and outlet ports. The system also includes a second pollutant-filtering apparatus having an inlet port connected to the exhaust from the internal combustion engine for receiving the pollutant mixture therefrom, the second apparatus including filtering material contained within the apparatus, second means for directing a filtering fluid through the filtering material to provide a coating thereon, second recirculating means for collecting pollutant-containing filtering fluid from a reservoir of said second apparatus, filtering said fluid and conducting the filtered fluid back to the fluid-directing means, second flow path means for directing the pollutant-containing exhaust through the fluid-coated filtering material to remove the pollutants therefrom, and an outlet port for releasing the pollutant-free exhaust to the atmosphere, the outlet port being larger than the inlet port to produce a pressure reduction in the pollutant exhaust in the path of travel through the second apparatus during passage between inlet and outlet ports.

The advantages of the foregoing invention are severalfold, including the already stated advantage that it provides a device in which no moving parts are needed in obtaining the filtering action of the device. Another advantage of the present invention is the provision of a system whereby filtering fluid such as engine oil or the like can be introduced into the housing for the filtering device and caused to drain by gravity feed through the filtering material, thereby coating the filtering material and at the same time removing the entrained pollutants and other deposited emissions to a reservoir at the bottom where it is retained as sludge.

The present invention provides a means whereby filtering fluid is continually cleansed and renewed. A filtering fluid-recirculating system is provided. Alternatively the recirculating system is part of the filtering apparatus or an independent part of the filtering apparatus and utilizes a conventional internal combustion engine oil circulating system for providing continual replenishment of the filtering fluid. When an independent part of the apparatus, the recirculating portion of the apparatus includes its own recirculating pump and fluid filtering section. When the recirculating portion is part of the conventional circulating system, the apparatus utilizes the normal engine oil pump and filter to clean the oil and is connected thereto by auxiliary conduit connections.

The filtering device of the present invention also differs from the devices of the prior art in that the filtering material is coated with the filtering fluid prior to introduction of the pollutant mixture. Only thereafter is the mixture to be cleansed directed through and over the filtering material to permit the filtering and cleaning action of the filtering material itself and the filtering fluid coated thereon to remove pollutants from the mixture introduced therein.

By utilizing the advantages of the air-oil separator as described in the earlier patent, namely, the reduction in pressure inherent in the provision of an outlet port having a diameter substantially greater than the inlet port in the circuitous path which the pollutant mixture is caused to follow through the filtering device, the filtering action of the present invention is substantially enhanced. A very marked reduction in the pollution content of crankcase emissions and from an internal combustion engine is achieved without the necessity for any modification whatsoever of the internal combustion engine itself, such as retarding the spark, disabling the vacuum advance, addition of accessories to eliminate nitrous oxide emissions, or the like. Utilization of the present invention permits a return to optimum tuning and operation at peak efficiency of an internal combustion engine such as was possible prior to the introduction of positive crankcase ventilation (PCV) systems and other efficiency reducing modifications. A most significant feature of the invention is that by return to optimum timing (i.e., elimination of spark retardation, etc.) and peak operating efficiencies, engines can be run at significantly lower temperatures again and a substantial increase in fuel efficiency is obtained. A return to an average mileage of between 15 to 20 miles per gallon can be expected, thereby providing still another extremely important advantage at a time when automobiles are still the most conspicuous oil consumers.

Finally, the provision of an apparatus whereby a specific reduction in the pressure of the air-pollutant mixture introduced into the apparatus is obtained enables the use of the present invention, for example, as a noise abatement device for use in the exhaust line of trucks and automobiles. Significant reductions, up to 50% reduction in noise level, are obtainable when the apparatus of the present invention is used in this manner.

DESCRIPTION OF THE DRAWINGS

These and other advantages will be better understood by reference to the figures of the drawing, wherein

FIG. 3 is a schematic illustration of the use of the filtering devices such as shown in FIGS. 1 and 2 in automobile engine air pollution control systems.

DESCRIPTION OF THE SPECIFIC EMBODIMENT

Figure 1:
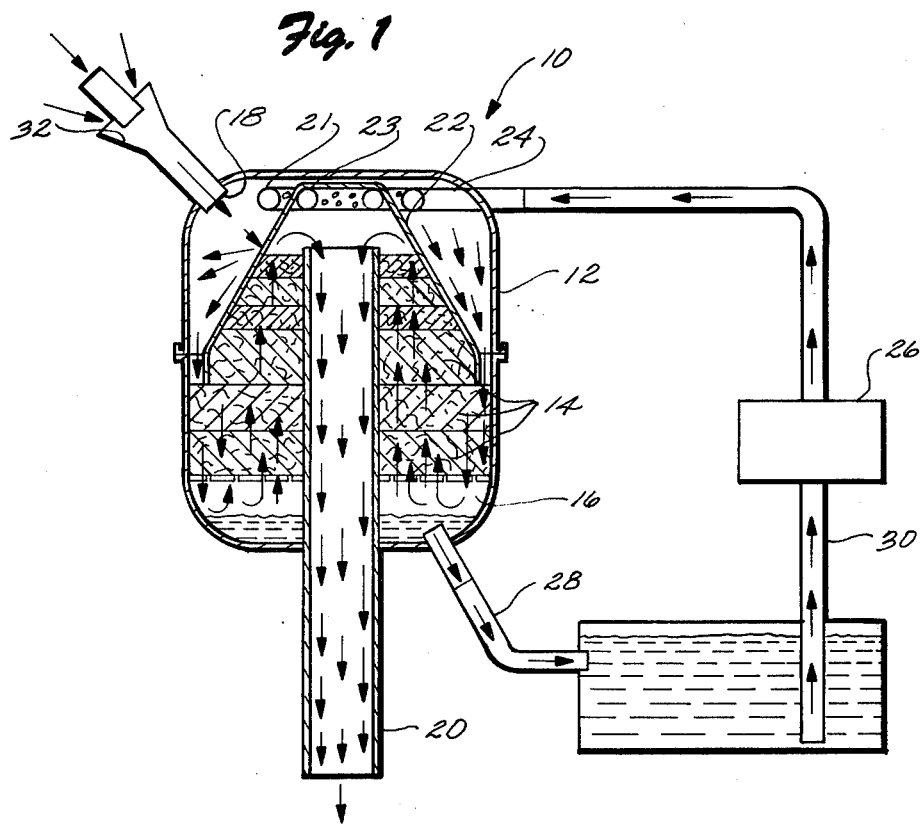
FIG. 1 is a schematic diagram in section of one embodiment of the filtering apparatus of the present invention.

A filtering apparatus 10 intended for use in filtering systems of the present invention is shown in FIG. 1. As shown therein, the device comprises a housing 12 in which is located several layers of filtering material 14, supported within the housing at a point above a reservoir 16 created at the bottom of the housing. An inlet port 18 is provided near the top of the device and an outlet port 20 of a size substantially larger in dimensional area than the inlet port 18 communicates with the interior of the device to receive the pollutant-containing gas mixtures after they have passed through the filtering material of the device.

As shown in FIG. 1, a cone-shaped baffle 22 is supported in the upper part of the housing opening downwardly and outwardly over the filtering material 14. Pollutant-containing mixtures or emissions flowing into apparatus 10 by means of inlet port 18 impinge on and are deflected throughout the upper portion of the housing 12 an thereafter caused to follow a flow path first downwardly and then to reverse direction and flow upwardly through the filtering material toward the outlet port. A filtering fluid dispersion conduit 24 is located at the top of the housing 12. A loop 21 and a loop 23 of conduit 24 extends around the exterior and interior of baffle 22 to provide a source of filtering fluid for thoroughly coating the filtering material. Conduit 24 and loops 21, 23 are perforated. A supply of filtering fluid is communicated from a pump 26 through the perforations in the conduit and loops and caused to fall on, drain through, and coat filtering material 14 in a gravity feed arrangement. The filtering fluid continually cleanses the filtering material and entrains and traps exhaust emissions an pollutants, causing them to drain into reservoir 16, where they are held. Thus, the supply of filtering fluid is continually replenished and the filtering action continually renewed. The filtering fluid is communicated by an outlet conduit 28 which enters into reservoir 16 at a point above the deposit of sludge and other filtered pollutants to carry the filtering fluid back to a supply reservoir 29 for the filtering fluid. When circulated through the filtering apparatus 10, fluid 27 is removed through conduit 30 from reservoir 29 by pump 26. Pump 26 includes filtering means such as a conventional oil filter to provide a clean and filtered supply of fluid for deposit on the filtering material 14.

Inlet port 18 is shown arranged with a venturi tube 32. When apparatus 10 is used at the exhaust side of an engine, the venturi tube 32 cools the exhaust emissions entering through inlet port 18 to further enhance the filtering action of the present invention. By reducing the temperature of the exhaust gases entering the filtering apparatus, the pollutant-containing gases are caused to give up and deposite hydrocarbons, oxides of nitrogen, and particulate material entrained in the exhaust more readily.

Figure 2:
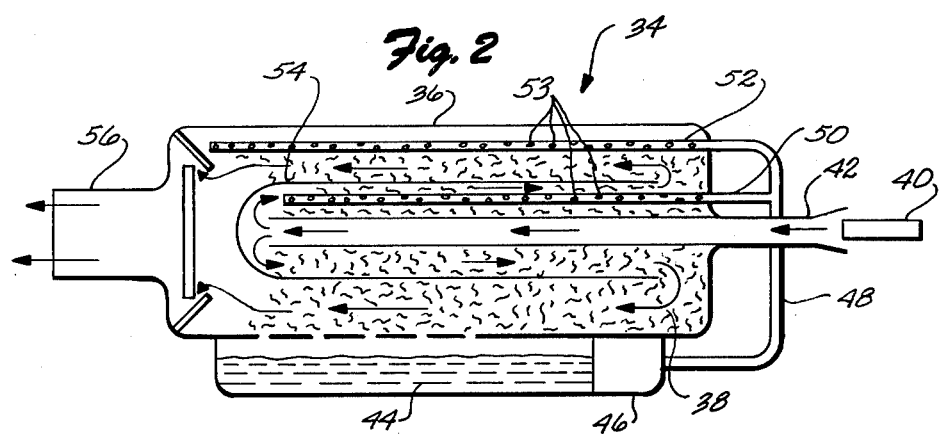
FIG. 2 is a schematic diagram in section of a second embodiment of the filtering apparatus of the present invention.

Another embodiment of the present invention is shown in FIG. 2. This embodiment is an elongated, horizontally arranged cylindrical apparatus 34 comprising a housing 36 in which is disposed a supply of filtering material 38. In this device the inlet port 40 is centrally located along the longitudinal axis of apparatus 34. A venturi tube 42 to precool pollutant-containing mixtures is again an optional provision, and is used primarily when apparatus 34 is used on the exhaust side of an internal combustion engine. A reservoir 44 for filtering fluid is located at the bottom of the apparatus. At one side of the reservoir a pump 46 including a fluid filter is provided for pumping the renewed and filtered fluid through a conduit 48 to a junction, where the fluid is supplied through dispersing conduits 50 and 52 to pass through perforations 53 located along the length of each of said conduits. The filtering fluid is thereby deposited upon and coats filtering material 38. As with apparatus 10, pollutant-containing gases trace a circuitous flow path through apparatus 34 flowing over and through the interstices of the filtering material. Filtering fluid slowly flows over the filtering material under gravity feed to reservoir 44. The effect of the fluid-coated filtering material on the gases flowing therethrough is to trap and entrain the pollutants in the gas mixtures. The pollutants are deposited on the filtering material and are carried to reservoir 44, where they are deposited as sludge. When a sizeable deposit of sludge has been built up, reservoir 44 is removed, the accumulated deposits dumped. The reservoir is then replaced, together with a new charge of filtering fluid. In a preferred embodiment of the invention, the filtering fluid is conventional lubricating engine oil. Among the preferred embodiments of the filtration material is a polyurethane foam sold under the trade name "Scot Filter Foam" having a density of approximately 6 pounds.

The filtering apparatus is provided with a baffle arrangement 54 to cause the air-pollutant mixture to follow a circuitous path through the filtering device to expose the mixture to maximum surface area of the filtering material and thereby enhance the filtering action of the apparatus. A second baffle 55 is located at the end of the flow path through the apparatus to introduce a further change in direction of gas flow. An outlt port 56 of a dimension substantially larger than the inlet port 40 provides the mechanism whereby a substantial pressure reduction in the gases flowing through the apparatus is obtained. This pressure reduction is a significant aspect of the filtering action of the present invention.

Utilization of the two embodiments of the filtering apparatus of the present invention in an automobile air-pollution control system is shown in FIG. 3. As shown therein, the apparatus 10 of FIG. 1 is connected to an engine 58 to receive crankcase emissions and is used in place of the positive crankcase ventilation (PCV) system now used as standard equipment on U.S. automobiles. Apparatus 34 of FIG. 2 is shown connected to the exhaust manifold 60 of the engine to produce a filtering and noise abatement action with respect to the exhaust emissions from the engine.

Crankcase emissions such as cylinder blowby gases and the like are communicated by conduit 62 to inlet port 18 on apparatus 10. The inlet port 18 has a substantially smaller diameter than outlet port 20 to provide a pressure reduction in such emissions. The system shown in FIG. 3 illustrates the manner in which the filtering apparatus 10 of the present invention utilizes the conventional lubricating engine oil circulation system to also supply the filtering fluid for use with the filtering apparatus 10. In this case the supply of filtering fluid is pumped by means of the engine oil pump (not shown) to the apparatus 10 by means of supply conduit 64, thereby eliminating the need for an independent pump 26 shown in FIG. 1. The oil from the engine is introduced into the interior of apparatus 10, dispersed by gravity flow through the filtering material, and caused to exert its filtering action in the manner previously described. The filtered emissions are then conducted through outlet port 20 to a chamber 66 such as an air filter provided at the intake side of the engine. A source 65 of outside air also communicates with chamber 66. The filtered emissions with the addition of air from source 66 are conducted to a carburetor 68 through conduit 67 prior to introduction into the cylinders of the internal combustion engine. Recirculation of the filtering fluid is obtained by means of conduit 67 which drains the fluid from the apparatus 10 to the crankcase of the engine, where it is then picked up by the engine oil circulating system, filtered, and returned to supply conduit 64.

At the exhaust side of the engine the emissions from the exhaust manifold 60 are communicated to inlet port 40, equipped with a venturi 42 to cool the exhaust emissions and thence to the interior of the filter apparatus 34 where the filtering action described in conjunction with the discussion of FIG. 2 is provided with respect to the exhaust emissions. The outlet port 56 is of a substantially larger diameter than inlet port 40 as illustrated, reducing the pressure of the exhaust emissions to essentially atmospheric pressure. Reservoir 44 and recirculating supply conduit 48 are also shown in FIG. 3. As shown in the embodiment of FIG. 2 and in FIG. 3, filtering apparatus 34 is provided with an independent filtering fluid circulating system and does not utilize the engine oil circulating system as is utilized by apparatus 10.

The combined filtering action of the two filtering devices of FIG. 3 on the engine emissions effects a significant and substantial reduction of the pollutant content of the emissions introduced therein. In preliminary tests the quality of the emissions from outlet port 56 have been significantly reduced without the necessity of any modification whatever of the engine with which the filtering devices of this system are utilized. It is expected that an internal combustion engine equipped with the filtrator apparatus at the intake and exhaust sides of the engine will be characterized by an emission level comparable to or exceeding in performance the emission control systems presently in use. An added and presently important advantage of the use of the filtrator apparatus of the present invention during the current energy crisis conditions is that use of the present invention is also expected to result in substantial fuel economy.

What is claimed is:

1. A filtering apparatus for pressurized air-contaminate mixtures comprising:
   a closed housing having a hollow interior;
   a liquid reservoir located at the bottom of the housing;
   at least one airtight inlet port opening into the housing interior for communicating air-contaminate mixtures at pressures higher than ambient pressure into the housing;
   a bed of filtration material located within the interior of the housing;
   means defining a flow path through the housing and bed of filtration material for air-contaminate mixtures introduced through the inlet port, said bed of filtration material being located transversely of the flow path;
   an outlet conduit extending axially through the bottom portion of the housing, the reservoir and a substantial portion of the filtration material, said outlet conduit having a greater cross sectional area than said inlet port such that a reduction in the pressure of the air-contaminate mixtures in the passage thereof through the housing toward the outlet conduit is produced causing deposition of contaminates in the mixture due to the pressure reduction;

baffling means located intermediate the inlet port and outlet conduit whereby the flow path through the housing reverses direction at least one time between inlet and outlet; and means for introducing a supply of a clean hydrocarbon filtering liquid into the housing for dispersion through the filtering material by gravity flow to coat the filtration material and to remove entrained contaminates deposited on the material to the reservoir, the filtering liquid introducing means including a liquid circulating system having recirculating pump means and an auxiliary inlet and outlet conduit interconnecting said pump means and the apparatus for continually recirculating filtering liquid within the apparatus.

2. An apparatus according to claim 1 connected to an internal combustion engine wherein the filtering hydrocarbon liquid is lubricating engine oil and the liquid circulating system is the lubricating oil circulating system of the engine.

* * * * *